(12) United States Patent
Kim et al.

(10) Patent No.: US 12,720,164 B2
(45) Date of Patent: Aug. 25, 2026

(54) ELECTRONIC DEVICE AND ELECTRONIC DEVICE CONTROL METHOD

(71) Applicant: SAMSUNG ELECTRONICS CO., LTD., Suwon-si (KR)

(72) Inventors: Munseok Kim, Suwon-si (KR); Sungyun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 18/382,874

(22) Filed: Oct. 23, 2023

(65) Prior Publication Data

US 2024/0048816 A1 Feb. 8, 2024

Related U.S. Application Data

(63) Continuation of application No. PCT/KR2022/006492, filed on May 6, 2022.

(30) Foreign Application Priority Data

May 26, 2021 (KR) ........................ 10-2021-0067756

(51) Int. Cl.
*H04N 21/482* (2011.01)

(52) U.S. Cl.
CPC ..... *H04N 21/4826* (2013.01); *H04N 21/4821* (2013.01)

(58) Field of Classification Search
CPC .. H04N 21/47; H04N 21/4532; H04N 21/482; H04N 21/4821; H04N 21/4316
See application file for complete search history.

(56) References Cited

U.S. PATENT DOCUMENTS 6,166,778 A * 12/2000 Yamamoto ....... H04N 21/47214 348/569
8,640,166 B1 * 1/2014 Craner ............... H04N 21/4826 725/38

(Continued)

FOREIGN PATENT DOCUMENTS

JP 4984739 B2 7/2012
JP 2018-50269 A 3/2018

(Continued)

OTHER PUBLICATIONS

International Search Report dated Aug. 12, 2022 issued by International Searching Authority in International Application No. PCT/KR2022/006492.

(Continued)

*Primary Examiner* — Jason Salce
(74) *Attorney, Agent, or Firm* — Sughrue Mion, PLLC

(57) ABSTRACT

Provided is an electronic device configured to receive a user command to display a recommended channel, identify a plurality of channels for providing video content corresponding to the preference information at a point in time at which the user command is received, identify the recommend channel from among the plurality of identified channels, based on at least one of a start time of a video content provided by each of the plurality of identified channels, and an end time of the video content provided by each of the (Continued)

510

| | BROADCAST TIME | | |
|---|---|---|---|
| PROGRAM A BROADCAST CHANNEL | 18:00 520 | 18:30 | 19:00 |
| CHANNEL 101 | PROGRAM A | ... 530 | |
| CHANNEL 102 | ... | PROGRAM A | ... |
| CHANNEL 103 | ... | ... | 540 |
| CHANNEL 104 | | ... | PROGRAM A |
| RECOMMENDED CHANNEL | CHANNEL 101 | CHANNEL 102 | CHANNEL 104 |
| | 550-1 | 550-2 | 550-3 |

plurality of identified channels, and control the display to display channel information about the identified recommended channel.

20 Claims, 15 Drawing Sheets

(56) References Cited

U.S. PATENT DOCUMENTS

| | | | | |
|---|---|---|---|---|
| 8,910,033 | B2 | 12/2014 | Cohen et al. | |
| 9,065,979 | B2 | 6/2015 | Cohen et al. | |
| 9,536,269 | B2 | 1/2017 | Chang et al. | |
| 9,674,572 | B2 | 6/2017 | Narahara et al. | |
| 9,980,007 | B1* | 5/2018 | Thompson | H04N 21/4858 |
| 10,708,665 | B2 | 7/2020 | Pontual et al. | |
| 11,252,375 | B2 | 2/2022 | Yoon et al. | |
| 11,412,308 | B2 | 8/2022 | Kim et al. | |
| 2002/0083452 | A1* | 6/2002 | Kikinis | H04N 21/6543 725/35 |
| 2002/0175953 | A1* | 11/2002 | Lin | H04N 21/4332 348/E5.006 |
| 2003/0018973 | A1* | 1/2003 | Thompson | H04N 21/2665 725/47 |
| 2003/0145326 | A1* | 7/2003 | Gutta | H04N 21/482 725/51 |
| 2009/0251611 | A1* | 10/2009 | Sumiyoshi | H04N 21/431 348/595 |
| 2014/0089980 | A1* | 3/2014 | Alexander | H04N 21/858 725/42 |
| 2014/0123204 | A1 | 5/2014 | Moon et al. | |
| 2015/0121408 | A1 | 4/2015 | Jacoby et al. | |

FOREIGN PATENT DOCUMENTS

| | | | |
|---|---|---|---|
| KR | 10-2005-0073266 | A | 7/2005 |
| KR | 10-2008-0002133 | A | 1/2008 |
| KR | 10-2014-0094132 | A | 7/2014 |
| KR | 10-1772404 | B1 | 8/2017 |
| KR | 10-2017-0107873 | A | 9/2017 |
| KR | 10-2017-0112099 | A | 10/2017 |
| KR | 10-2019-0015964 | A | 2/2019 |
| KR | 10-2019-0129558 | A | 11/2019 |
| KR | 10-2020-0009645 | A | 1/2020 |
| KR | 10-2020-0085463 | A | 7/2020 |

OTHER PUBLICATIONS

Written Opinion dated Aug. 12, 2022 issued by International Searching Authority in International Application No. PCT/KR2022/006492.

Extended European Search Report issued on Apr. 18, 2024 by the European Patent Office for EP Patent Application No. 22811521.8.

Communication dated May 19, 2025, issued by Korean Intellectual Property Office in Korean Patent Application No. 10-2021-0067756.

Communication dated Jul. 23, 2025, issued by European Patent Office in European Patent Application No. 22811521.8.

* cited by examiner

| VIEWING TIME DATA | |
|---|---|
| TIME | CHANNEL NAME ( PROGRAM NAME - GENRE NAME) |
| 17:00-18:00 | 1.CHANNEL 101 (PROGRAM A - COMEDY) : 28 MINUTES<br>2.CHANNEL 101 (PROGRAM C - VARIETY SHOW ) : 18 MINUTES<br>3.CHANNEL 201 (PROGRAM B - SPORTS) : 14 MINUTES |
| 18:00-19:00 | 320-1 1.CHANNEL 101 (PROGRAM A - COMEDY) : 28 MINUTES<br>320-2 2.CHANNEL 301 (PROGRAM D - REALITY) : 20 MINUTES<br>320-3 3.CHANNEL 401 (PROGRAM E - REALITY) : 12 MINUTES |
| 19:00-20:00 | 330-1 1.CHANNEL 501 (PROGRAM F - DRAMA) : 57MINUTES<br>330-2 2.CHANNEL 401 (PROGRAM E - REALITY) : 3MINUTES |
| 20:00-21:00 | 1. CHANNEL 501 (PROGRAM F - DRAMA) : 33MINUTES<br>2. CHANNEL 501 (PROGRAM G - SPORTS) : 27MINUTES |
| 21:00-22:00 | 1.CHANNEL 101 (PROGRAM H - DOCUMENTARY) : 30MINUTES<br>2.CHANNEL 301 (PROGRAM I - DRAMA) : 17MINUTES<br>3.CHANNEL 501 (PROGRAM G - SPORTS) : 13MINUTES |
| ... | ... |

| USER PREFERENCE DATA | | | |
|---|---|---|---|
| TIME | CHANNEL | PROGRAM | GENRE |
| 17:00~18:00 | 1.CHANNEL 101<br>2.CHANNEL 201 | 1.PROGRAM A<br>2.PROGRAM B<br>3.PROGRAM C | 1.COMEDY<br>2.VARIETY SHOW<br>3.SPORTS |
| 18:00~19:00 | 1.CHANNEL 101<br>2.CHANNEL 301<br>3.CHANNEL 401<br>420-1 | 1.PROGRAM A<br>2.PROGRAM D<br>3.PROGRAM E<br>430-1 | 1.REALITY<br>2.COMEDY<br>440-1 |
| 19:00~20:00 | 1.CHANNEL 501<br>420-2 | 1.PROGRAM F<br>430-2 | 1.DRAMA<br>440-2 |
| 20:00~21:00 | 1.CHANNEL 501 | 1.PROGRAM F<br>2.PROGRAM G | 1.DRAMA<br>2.SPORTS |
| 21:00~22:00 | 1.CHANNEL 101<br>2.CHANNEL 301<br>3.CHANNEL 501 | 1.PROGRAM H<br>2.PROGRAM I<br>3.PROGRAM G | 1.DOCUMENTARY<br>2.DRAMA<br>3.SPORTS |
| ... | ... | ... | ... |

Figure 8:
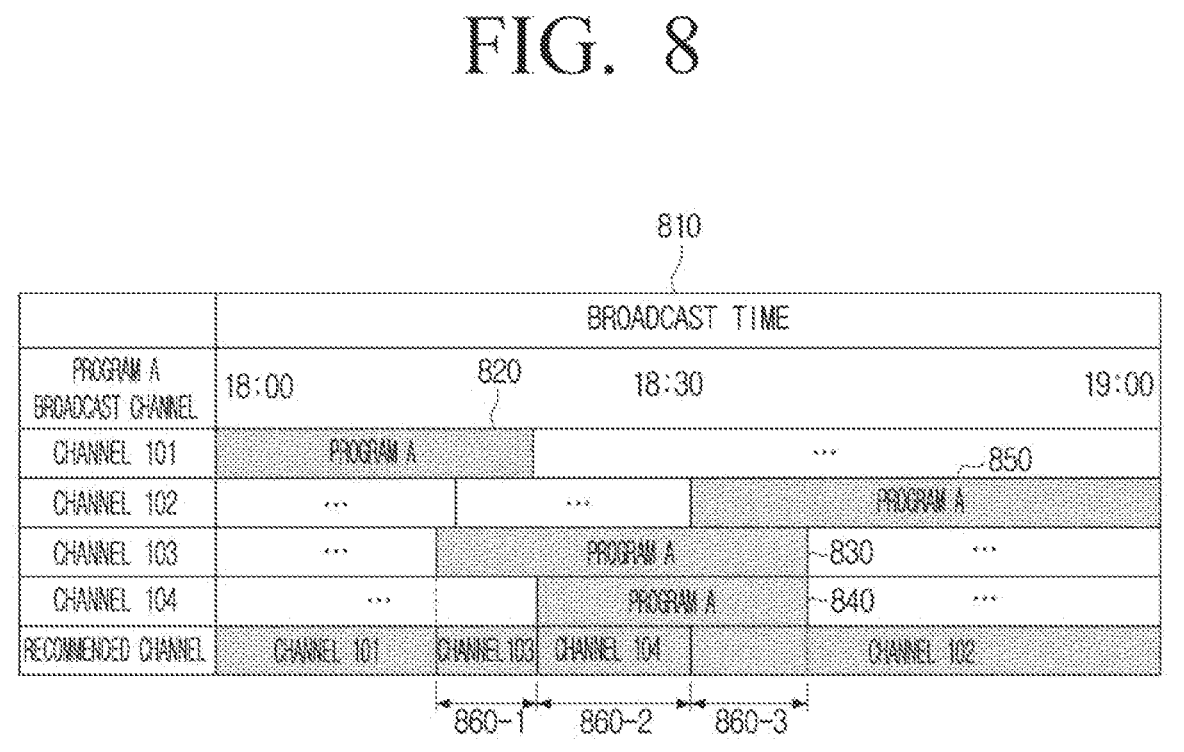

| | BROADCAST TIME | | | |
|---|---|---|---|---|
| PROGRAM A BROADCAST CHANNEL | 18:00 | 820 | 18:30 | 19:00 |
| CHANNEL 101 | PROGRAM A | ... | 850 | |
| CHANNEL 102 | ... | ... | PROGRAM A | |
| CHANNEL 103 | ... | PROGRAM A | ~830 | ... |
| CHANNEL 104 | ... | PROGRAM A | ~840 | ... |
| RECOMMENDED CHANNEL | CHANNEL 101 | CHANNEL 103 | CHANNEL 104 | CHANNEL 102 |

RECOMMENDED CHANNEL LIST AS OF 18:40

121

| Ocean Life CHANNEL 101 | M CHANNEL 102 | ESPN CHANNEL 402 | NEWS CHANNEL 301 | AA CHANNEL 302 | Daily CHANNEL 503 | ... |
|---|---|---|---|---|---|---|

121-1 121-2 121-3 121-4 121-5 121-6

| PREFERENCE RANKING | CHANNEL PREFERENCE | PROGRAM PREFERENCE | GENRE PREFERENCE |
|---|---|---|---|
| 1ST RANKING | CHANNEL 101 | CHANNEL 102 (PROGRAM A) | CHANNEL 402 (REALITY) |
| 2ND RANKING | CHANNEL 301 | CHANNEL 302 (PROGRAM D) | CHANNEL 503 (COMEDY) |
| 3RD RANKING | CHANNEL 401 | CHANNEL 406 (PROGRAM E) | |

FIG. 13
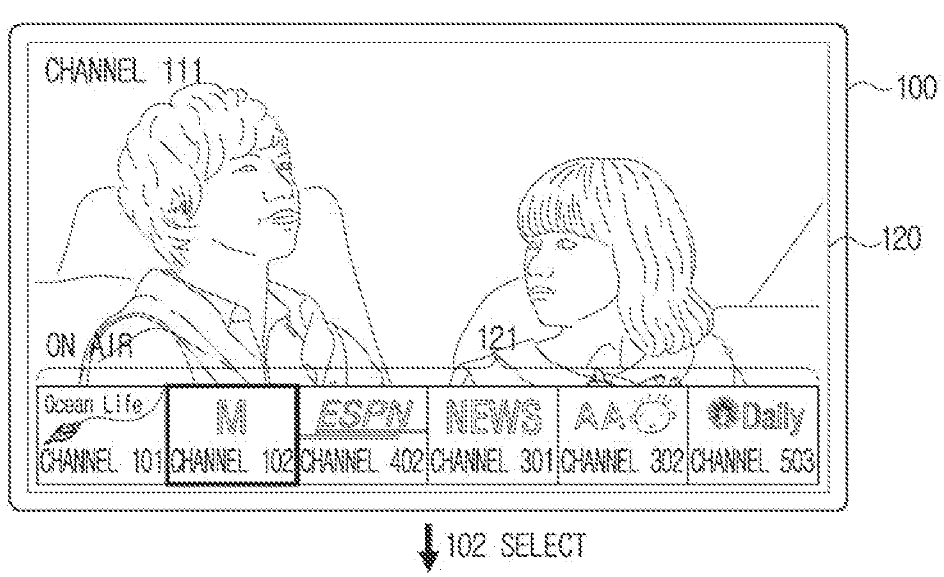
102 SELECT
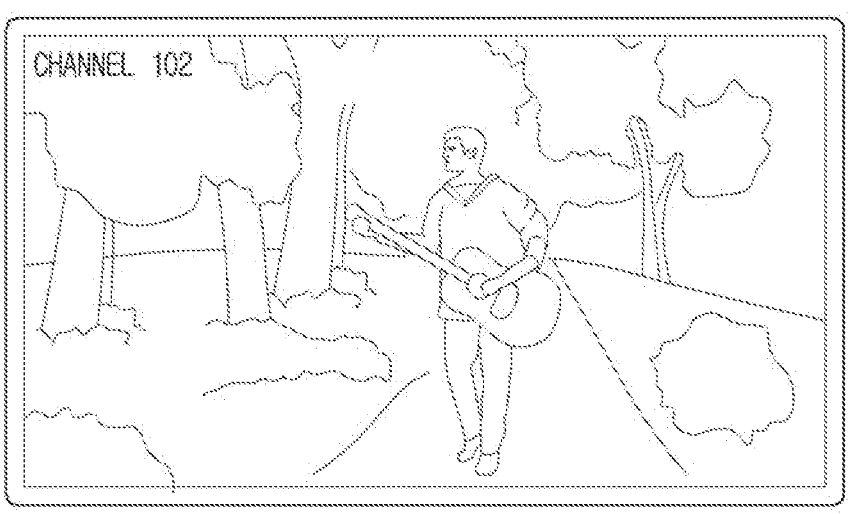

ELECTRONIC DEVICE AND ELECTRONIC DEVICE CONTROL METHOD

CROSS-REFERENCE TO RELATED APPLICATION(S)

This application is a bypass continuation of PCT International Application No. PCT/KR2022/006492, which was filed on May 6, 2022, and claims priority to Korean Patent Application No. 10-2021-0067756, filed on May 26, 2021, in the Korean Intellectual Property Office, the disclosures of which are incorporated herein by reference in their entireties.

BACKGROUND

1. Field

The disclosure relates to an electronic device and an electronic device control method, and more specifically, to an electronic device for displaying a recommended content and for providing preference-based video content, and an electronic device control method thereof.

2. Description of Related Art

Amid popularity of a smart television (TV), a function of providing a recommended channel list recommending a channel, which is one of functions of a smart TV, is increasing.

In this case, most broadcasting providers or manufacturers simply generate a recommended channel list based on a popular channel or recommend a channel based on a viewing time accumulated for each device, thereby recommending a channel without distinguishing video content and genre in a limited display space.

SUMMARY

Provided are an electronic device and an electronic device control method. The electronic device may be configured to obtain video content and preference information for each preferred genre of a user based on a viewing time for the video content, and providing a recommended channel for providing video content preferred by the user and video content of the genre at a point in time when a command for displaying the recommended channel is input.

In example embodiments of the disclosure, information about a personalized recommended channel may be provided in that a recommended channel is determined based on a user's channel, video content, and preference information for each genre in a limited space. In addition, it is possible to provide information about a recommended channel capable of providing an optimal viewing experience to a user in that a recommended channel is determined in consideration of a start time and an end time of the video content.

According to an aspect of the disclosure, an electronic device includes: a display; a memory for storing preference information of a user, and at least one instruction, the preference information of the user determined based on viewing time of video content; and at least one processor. The at least one processor is configured to execute the at least one instruction to: based on receiving a user command to display a recommended channel, identify a plurality of channels for providing video content corresponding to the preference information at a point in time at which the user command is received, identify the recommend channel from among the plurality of identified channels, based on at least one of a start time of a video content provided by each of the plurality of identified channels, and an end time of the video content provided by each of the plurality of identified channels, and control the display to display channel information about the identified recommended channel.

The at least one processor may be further configured to execute the at least one instruction to: identify the recommend channel from among the plurality of identified channels based on the end time of the video content provided by each of the plurality of identified channels such that the video content provided by the recommend channel has a longest remaining time to the end time of the video content with respect to the point in time at which the user command is received.

The at least one processor may be further configured to execute the at least one instruction to: based on identifying at least two channels providing video content having the longest remaining time from among the plurality of identified channels, identify the recommend channel from among the at least two channels such that the video content provided by the recommended channel has a later start time with respect to the time point at which the user command is received.

The at least one processor may be further configured to execute the at least one instruction to: based on the start time of video content provided by each of the plurality of identified channels, identify the recommend channel among the plurality of identified channels based on video content having a most recent start time with reference to the point in time at which the user command is received.

The at least one processor may be further configured to execute the at least one instruction to: based on identifying at least two channels providing video content having the most recent start time from among the plurality of identified channels, identify the recommend channel from among the at least two channels such that the video content provided by the recommend channel has a longest remaining time to the end time of the video content with respect to the point in time at which the user command is received.

The preference information may include a plurality of preferred video contents and a plurality of preferred genres determined based on a viewing time associated with each of the plurality of preferred video contents and each of the plurality of preferred genres, and the at least one processor may be further configured to execute the at least one instruction to: based on the user command to display the recommended channel being received, identify the plurality of channels for providing each of the plurality of preferred video contents and each of the plurality of preferred genres at the point in time at which the user command is received, display the channel information corresponding to each of the plurality of identified channels based on an order of the plurality of preferred video contents, and display the channel information corresponding to the plurality of identified channels based on an order of the plurality of preferred genres, where the order of the plurality of preferred video contents is based on a viewing time associated with each of the preferred video contents, and where the order of the plurality of preferred genres is based on a viewing time associated with each of the preferred genres.

The preference information may include a plurality of preferred channels determined based on a viewing time associated with each of the plurality of preferred channels, and the at least one processor may be further configured to execute the at least one instruction to: control the display to display the channel information about the plurality of preferred channels based on an order of the plurality of preferred channels, and where the order of the plurality of preferred channels is based on a viewing time associated with each of the preferred channels.

The channel information about the recommended channel may include at least one of a channel name or a thumbnail image of the video content provided by the recommended channel.

According to an aspect of the disclosure, a method of controlling an electronic device, includes: storing preference information of a user, the preference information comprising a plurality of preferred video contents and a plurality of preferred genres based on viewing time of video content; based on receiving a user command to display a recommended channel, identifying a plurality of channels for providing video content at a point in time at which the user command is received, the video content corresponding to the plurality of preferred video contents the plurality of preferred genres; identifying the recommended channel from among the plurality of identified channels, based on at least of a start time of a video content provided by each of the plurality of identified channels, and an end time of the video content provided by each of the plurality of identified channels; and displaying channel information about the identified recommended channel based on the preference information.

The method of identifying the recommended channel may include: identifying the recommended channel from among the plurality of identified channels based on the end time of the video content provided by each of the plurality of identified channels such that the video content provided by the recommended channel has a longest remaining time to the end time of the video content with respect to the point in time at which the user command is received.

The method of identifying the recommended channel may include: identifying at least two channels providing video content having the longest remaining time, from among the plurality of identified channels; and identifying the recommend channel from among the at least two channels such that the video content provided by the recommended channel has a later start time with respect to the time point at which the user command is received.

The method of identifying the recommended channel may include: based on the start time of video content provided by each of the plurality of identified channels, identifying the recommended channel among the plurality of identified channels based on video content having a most recent start time with reference to the point in time at which the user command is received.

The method of identifying the recommended channel may include: identifying at least two channels providing video content having the most recent start time from among the plurality of identified channels; identifying the recommend channel from among the at least two channels such that the video content provided by the recommended channel has a later start time with reference to the point in time at which the user command is received.

The method of displaying the channel information about the identified recommended channel may include: displaying channel information corresponding to the plurality of identified channels based on an order of the plurality of preferred video contents; displaying channel information corresponding to the plurality of identified channels based on an order of the plurality of preferred genres, where the order of the plurality of preferred video contents is based on a viewing time associated with each of the preferred video content, and where the order of the plurality of preferred genres is based on a viewing time associated with each of the preferred genres.

The preference information further may include a plurality of preferred channels determined based on a viewing time associated with each of the plurality of preferred channels, where the method of displaying the channel information about the plurality of identified channels may include displaying information about the plurality of preferred channel based on an order of the plurality of preferred channels, and where the order of the plurality of preferred channels is based on a viewing time associated with each of the preferred channels.

According to an aspect of the disclosure, a non-transitory computer readable medium stores computer readable program code or instructions which are executable by a processor to perform a method for controlling an electronic device. The method includes: storing preference information of a user, the preference information comprising a plurality of preferred video contents and a plurality of preferred genres based on viewing time of video content; based on receiving a user command to display a recommended channel, identifying a plurality of channels for providing video content at a point in time at which the user command is received, the video content corresponding to the plurality of preferred video contents the plurality of preferred genres; identifying the recommended channel from among the plurality of identified channels, based on at least of a start time of a video content provided by each of the plurality of identified channels, and an end time of the video content provided by each of the plurality of identified channels; and displaying channel information about the identified recommended channel based on the preference information.

The identifying the recommended channel comprises: identifying at least two channels providing video content having a longest remaining time, from among the plurality of identified channels; and identifying the recommend channel from among the at least two channels such that the video content provided by the recommended channel has a later start time with respect to the time point at which the user command is received.

The identifying the recommended channel comprises: identifying at least two channels providing video content having a most recent start time, from among the plurality of identified channels; and identifying the recommend channel from among the at least two channels such that the video content provided by the recommended channel has a later start time with reference to the point in time at which the user command is received.

The displaying the channel information about the identified recommended channel comprises: displaying channel information corresponding to the plurality of identified channels based on an order of the plurality of preferred video contents; displaying channel information corresponding to the plurality of identified channels based on an order of the plurality of preferred genres, where the order of the plurality of preferred video contents is based on a viewing time associated with each of the preferred video content, and where the order of the plurality of preferred genres is based on a viewing time associated with each of the preferred genres.

The preference information may include a plurality of preferred channels determined based on a viewing time associated with each of the plurality of preferred channels, where the displaying the channel information about the plurality of identified channels may include displaying information about the plurality of preferred channel based on an order of the plurality of preferred channels, and where the order of the plurality of preferred channels is based on a viewing time associated with each of the preferred channels.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a diagram illustrating viewing time data according to an embodiment;

FIG. 4 is a diagram illustrating user preference information according to an embodiment;

FIGS. 5-10 are diagrams illustrating a method of identifying a channel to provide a video content corresponding to user preference information in an electronic device according to an embodiment;

FIG. 11 is a diagram illustrating a method of displaying information about an identified channel by an electronic device according to an embodiment;

FIGS. 12-13 are diagrams illustrating a method of displaying a recommended channel list by an electronic device according to an embodiment;

DETAILED DESCRIPTION

Figure 1:
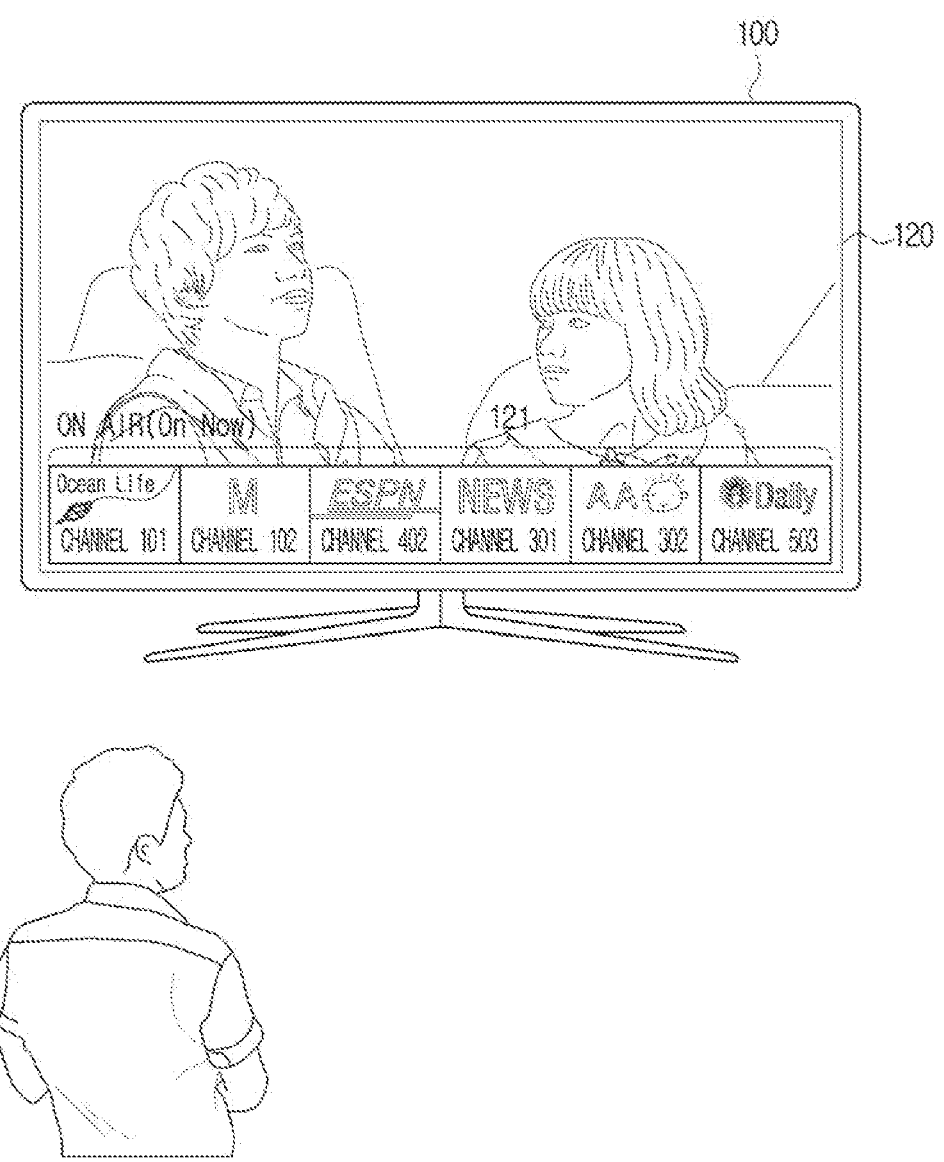
FIG. 1 is a diagram illustrating an electronic device according to an embodiment.

Hereinafter, embodiments of the disclosure will be described with reference to the accompanying drawings. However, it may be understood that the disclosure is not limited to the embodiments described hereinafter, but also includes various modifications, equivalents, and/or alternatives of the embodiments of the disclosure. In relation to explanation of the drawings, similar drawing reference numerals may be used for similar constituent elements.

In case it is determined that in describing embodiments, detailed explanation of related known technologies may unnecessarily confuse the gist of the disclosure, the detailed explanation will be omitted.

In addition, the following embodiments may be modified into various other forms, and the scope of the technical spirit of the present disclosure is not limited to the following examples. Rather, these embodiments are provided so that the present disclosure will be more thorough and complete, and will fully convey the scope of the technical spirit of the present disclosure to those skilled in the art.

The terms used herein are to describe certain embodiments and are not intended to limit the scope of claims. A singular expression includes a plural expression unless otherwise specified.

In this specification, the expressions "have," "may have," "include," or "may include" or the like represent presence of a corresponding feature (for example: components such as numbers, functions, operations, or parts) and does not exclude the presence of additional feature.

In this document, expressions such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

As used herein, the terms "first," "second," or the like may denote various components, regardless of order and/or importance, and may be used to distinguish one component from another, and does not limit the components.

If it is described that a certain element (e.g., first element) is "operatively or communicatively coupled with/to" or is "connected to" another element (e.g., second element), it should be understood that the certain element may be connected to the other element directly or through still another element (e.g., third element).

If it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. The term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

It is understood that various elements and regions in the figures are shown out of scale. Accordingly, the scope of the disclosure is not limited by the relative sizes or spacing drawn from the accompanying drawings.

Hereinafter, with reference to the attached drawings, embodiments will be described in detail so that those skilled in the art to which the disclosure belongs to can easily make and use the embodiments.

FIG. 1 is a diagram illustrating an electronic device according to an embodiment.

An electronic device 100 may display video content on a display 120.

The video content may include various programs provided by various broadcasting services like terrestrial broadcasting, cable broadcasting, satellite broadcasting, or the like, through a channel.

The video content may include various programs provided by providers of an over-the-top (OTT) media service through a channel. In this case, the video content provided through the OTT service may include video content provided by the VOD method and video content streamed through a live channel of the OTT service.

When a user command to display a recommended channel is input, the electronic device 100 may display a recommended channel list 121 on the display 120.

The user command to display a recommended channel list may be input by various methods such as remote control operation, speech recognition, touch input by a button provided in the electronic device 100, or the like.

The recommended channel list 121 may include a video content preferred by a user among a plurality of video content currently broadcasted through a plurality of channels and information about video content of a genre preferred by a user among the genres of a plurality of video content broadcasted through a plurality of channels.

Here, a plurality of video content broadcasted through a plurality of channels may mean a plurality of programs provided through a plurality of channels at a point in time when a user command for displaying a recommended channel is inputted. In addition, the plurality of channels may include a plurality of channels in which at least one of a broadcasting and an OTT service is provided.

In an embodiment, the electronic device 100 may prestore preference information of a user.

The preference information may include preference information by video contents determined based on viewing time for each video content and preference information by genres determined based on a viewing time for each genre of the video content.

In an embodiment, the electronic device 100 may determine a video content preferred by a user among a plurality of video content broadcasted through a plurality of channels by using preference information, and may determine a genre preferred by the user among a plurality of genres of a plurality of video content broadcasted through the plurality of channels by using preference information. The electronic device 100 may display a recommended channel list including a channel for providing the determined video content and genre and information about video content and genre provided in the corresponding channel.

When there are a plurality of channels for providing the same video content, the electronic device 100 may determine one channel from among a plurality of channels based on at least one of a start time and an end time of video content provided from each of the plurality of channels, and display a recommended channel list including information about video content provided from the determined channel.

In an embodiment, the electronic device 100 may select one channel from among a plurality of channels based on at least one of a start time and an end time of video content provided from each of a plurality of channels when a user preferred video content is provided by a plurality of channels.

For example, the electronic device 100 may select a channel providing a video content which began relatively recently or a channel providing video content having relatively longer remaining time to the end of the content.

According to various embodiments of the disclosure, in that a channel selected based on at least one of start time and end time of video content is provided as a recommended channel, channels viewed by a user for a longer time or channels providing video content preferred by a user which the user may be more immersed in may be displayed on a recommended channel list.

Figure 2:
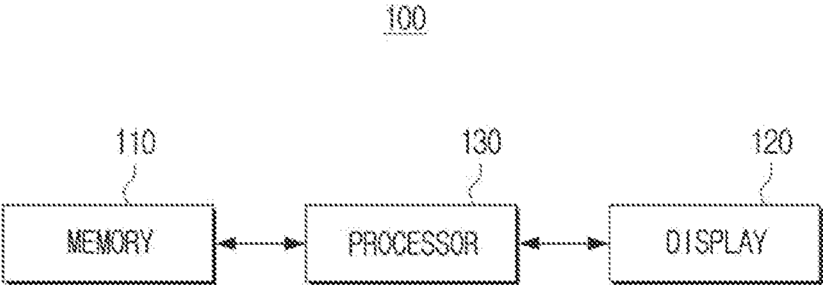
FIG. 2 is a block diagram illustrating a configuration of an electronic device according to an embodiment.

FIG. 2 is a block diagram illustrating a configuration of an electronic device according to an embodiment.

Referring to FIG. 2, the electronic device 100 includes a memory 110, a display 120, and a processor 130.

The memory 110 may store data for the operation of the electronic device 100. For example, the memory 110 may store preference information of the user, which is determined based on the viewing time for the video content. The preference information will be described in detail later.

At least one instruction regarding the electronic device 100 may be stored in the memory 110. In addition, an operating system (O/S) for driving the electronic device 100 may be stored in the memory 110. The memory 110 may store various software programs or applications for operating the electronic device 100 according to various embodiments. The memory 110 may include a semiconductor memory such as a flash memory, a magnetic storage medium such as a hard disk, or the like.

In an embodiment, the memory 110 may store various software modules for operating the electronic device 100, and the processor 130 may control the operation of the electronic device 100 by executing various software modules that are stored in the memory 110. That is, the memory 110 may be accessed by the processor 130, and may perform reading, recording, modifying, deleting, updating, or the like, of data by the processor 130.

It is understood that the term memory may be used to refer to a memory 110, a ROM, RAM in the processor 130 or a memory card (e.g., a micro SD card, a memory stick) mounted to the electronic device 100.

The display 120 may display various video contents. In an embodiment, the display 120 may be implemented with various types of displays like LCD, LED, OLED, or the like.

The processor 130 may be electrically connected to the memory 110 and the display 120 and may control overall operations and functions of the electronic device 100. In an embodiment, the processor 130 may include a single processor or a plurality of processors (e.g., a plurality of different processors (CPU, APU, GPU, etc.), a plurality of different cores in a single processor, etc.).

In an embodiment, the processor 130 may include a central processing unit (CPU) or an application processor (AP), and may execute at least one software program stored in a memory according to one or more instructions stored in the memory 110 of the electronic device 100.

In an embodiment, the processor 130 may generate preference information of a user based on viewing time for the video content and may store the generated preference information in the memory 110.

In an embodiment, the processor 130 may generate viewing time data based on the viewing time for the video content and may generate preference information by using the viewing time data.

The viewing time may mean a time when the video content is displayed through the display 120.

In an embodiment, the processor 130 may identify a video content displayed on the display 120, a channel providing the video content, and a genre of the video content.

For example, the processor 130 may identify the video content displayed in the display 120, a channel providing the video content, and a genre of the video content by using automatic content recognition (ACR) technology.

The ACR technology refers to a technology for extracting video data or sound data included in the video content to identify which content is the video content, and comparing the extracted data with pre-stored data to identify the video content. The pre-stored data may include all or a part of an image frame constituting a specific video content and all or a part of data of the sound data constituting the specific video content.

In an embodiment, the processor 130, by using the ACR technology, may determine the video content displayed on the display 120.

The processor 130 may, by using metadata, identify the channel providing the identified video content and the genre of the video content.

The metadata may include information about video content provided through broadcasting and OTT services (e.g., a name of video content, a genre of video content, a channel in which video content is provided, and a time (e.g., start time and end time) at which video content is provided. The metadata may be received through a channel through which broadcasting and OTT service are provided.

In the above-described example, it is described that the processor 130 identifies the video content, a channel for providing video content, and the genre of the video content by using ACR technology, but this is merely an example. That is, the processor 130 may use an optical character reader (OCR) technology. For example, the processor 130 may recognize a character, a number, and the like included in the video content displayed on the display 120 by using an OCR technology, and if a channel number and a name of the video content are identified from a recognition result, the processor 130 may identify the video content, the channel providing the video content, and the genre of the video content based on the identification.

In addition, the processor 130 may identify a viewing time of the video content. That is, the processor 130 may identify the time during which the video content is displayed on the display 120.

For example, the processor 130 may repeatedly identify video content displayed on the display 120 at regular time intervals to identify the time at which the video content is displayed on the display 120.

For example, the processor 130 may identify video content displayed on the display 120 according to a predetermined time interval (T), and when the same video content is continuously identified during the N number of times, the processor 130 may determine that the video content is displayed on the display 120 for a T×N time.

The processor 130 may generate viewing time data by using viewing time for the video content.

In this case, the viewing time data may include a channel in which the video content is provided, a genre of the video content and information about a viewing time of the video content.

For example, as shown in FIG. 3, when the viewing time for the program A broadcasted at 18:00 to 19:00 is 28 minutes, the processor 130 may generate viewing time data 320-1 including information indicating that viewing time of the program A having a comedy genre provided in channel 101 is 28 minutes.

In addition, when the viewing time for the program D broadcasted at 18:00 to 19:00 is 20 minutes, the processor 130 may generate viewing time data 320-2 including information that the viewing time of the program D having a genre of reality provided in channel 301 is 20 minutes.

In addition, when the viewing time for the program E broadcasted at 18:00 to 19:00 is 12 minutes, the processor 130 may generate viewing time data 320-3 including information indicating that the viewing time for the program E having a genre of reality provided by channel 401 is 18 minutes.

Through the method described above, the processor 130 may generate viewing time data 310 by analyzing the video content displayed on the display 120, the genre of the video content, and the viewing time for the video content for each time interval.

The processor 130 may generate preference information by using the generated viewing time data.

In this example, the preference information may include preference information by channels, video contents, and genres.

For this, the processor 130 may identify viewing time for each channel, viewing time for each video content, and viewing time for each genre with respect to a predetermined time interval based on viewing time data, and may generate preference information for each channel, video content, and genre in a predetermined time interval based on the identified viewing time.

The predetermined time interval may be, for example, one hour, but this is exemplary, and may be set to various time intervals like 30 minutes, two hours, and so on, and may be changed according to a user command afterwards.

In an embodiment, the processor 130 may determine rankings of channels in the order of channels having a large viewing time for each time interval, and generate preference information including information about the determined rankings for each time interval. Accordingly, a channel having a large viewing time has a relatively higher preference than a channel having a low viewing time.

The processor 130 may determine the ranking of video content in the order of video content having a large viewing time for each time interval, and generate preference information including information about the determined ranking for each time interval. Accordingly, video content having a large viewing time has a relatively higher preference than a video content having low viewing time.

In addition, the processor 130 may determine a ranking for the genre in the order of a genre having a large viewing time for each time interval, and may generate preference information including information about the determined ranking for each time interval. Accordingly, a genre having a large viewing time may have a relatively higher preference than a genre having a low viewing time.

When the viewing time for the same channel, the same video content, or the same genre is present in one time interval the processor 130 may sum up the viewing time and generate preference information based on the summed viewing time.

To be specific, when there are a plurality of viewing times for the same channel in one time interval, the processor 130 may sum up a plurality of viewing times and may determine the order of the corresponding channel by using the summed up viewing time.

When a plurality of viewing times for the same video content are present in one time interval, the processor 130 may sum up a plurality of viewing times, and may determine the order of the corresponding video content by using the summed viewing time.

In addition, the processor 130 may, when there are a plurality of viewing times for the same genre in one time interval, may sum up a plurality of viewing times and may determine the order of the genre based on the summed up viewing time.

Hereinbelow, a method of generating preference information will be described in greater detail.

FIG. 3 is a diagram illustrating viewing time data according to an embodiment.

FIG. 4 is a diagram illustrating user preference information according to an embodiment.

Referring to FIG. 3, viewing time data 320-1, 320-2, 330-3 is generated at 18:00 to 19:00.

In this case, referring to FIG. 3, the viewing time for channel 101 is 28 minutes, the viewing time for channel 301 is 20 minutes, and the viewing time for channel 401 is 12 minutes at the time of 18:00 to 19:00, the channel 101, the channel 301, and the channel 401, in order, have a viewing time. In this case, as shown in FIG. 4, the processor 130 may generate preference information 420-1 for each channel at 18:00 to 19:00 including information indicating that the channel having the highest preference is channel 101, the channel having the next higher preference is 301, and the channel having the second next higher preference is 401.

In addition, as shown in FIG. 3, the viewing time for the program A is 28 minutes, the viewing time for the program D is 20 minutes, and the viewing time for the program E is 12 minutes, and the program A, the program D, and the program E, in order, have a high viewing time. In this case, as shown in FIG. 4, the processor 130 may generate preference information 430-1 for each program at 18:00 to 19:00, wherein the program having the highest preference is A, the program having the next higher preference is D, and the channel having the second next higher preference is E.

In addition, as shown in FIG. 3, the viewing time for the comedy genre is 28 minutes at 18:00 to 19:00. In the case of viewing time for reality genre, viewing time for program D is 20 minutes and the viewing time for program E is 12 minutes. In this case, the processor 130 may determine that the viewing time for the reality genre is 32 minutes by adding viewing time of the program D and the program E having a reality genre. In this case, as shown in FIG. 4, the processor 130 may generate preference information 440-1 for each genre at 18:00 to 19:00 indicating that the genre having a highest preference is reality, and a genre having the next highest preference is comedy.

The processor 130 may generate the preference information by using only the viewing time data in which the viewing time exceeds a preset value.

That is, the processor 130 may generate preference information excluding a channel, video content, and genre having a low viewing time. In the case of the channel, video content, and genre having a relatively low viewing time, it is not likely that a user prefers the channel, video content, and genre.

For example, as illustrated in FIG. 3, the viewing time data 330-1, 320-2 for 19:00 to 20:00 is generated, and the preference information is generated by using only viewing time data that the viewing time exceeds five minutes.

In this case, the processor 130 may generate preference information based only on the viewing time for channel 501 in that the viewing time for the channel 501 is 57 minutes and the viewing time for the channel 401 is three minutes at 19:00 to 20:00. That is, as shown in FIG. 4, the processor 130 may generate preference information 420-2 for each channel at 19:00 to 20:00 including information indicating channel 101 has the highest preference.

In addition, the processor 130 may generate preference information based only on the viewing time for the program F in that the viewing time for the program F is 57 minutes and the viewing time for the program E is three minutes at 19:00 to 20:00 That is, as shown in FIG. 4, the processor 130 may generate preference information 430-2 for each video content at 19:00 to 20:00 including information that a program having the highest preference is the program F.

In addition, as shown in FIG. 3, the processor 130 may generate preference information based only on the viewing time for the drama genre in that the viewing time for the drama genre is 57 minutes and the viewing time for the reality genre is 3 minutes. That is, as shown in FIG. 4, the processor 130 may generate preference information 440-2 for each genre at 19:00 to 20:00 including information indicating that the genre having the highest preference is drama.

Through this method, the processor 130 may, by using the generated viewing time data, generate preference information 410 including preference information 420 by channels, preference information 430 by video contents and preference information 440 by genres in a plurality of time intervals.

in the above-described example, preference information includes information about a ranking determined based on the viewing time, but this is merely an example. That is, the processor 130 may determine that the viewing time (or the summed viewing time) is preference information. In this case, the processor 130 may determine the ranking of the channel, the video content, and the genre in each time interval by using preference information.

Also, in the above-described example, preference information is generated by using only viewing time data in which viewing time exceeds a preset value, but this is merely an example. That is, the processor 130 may generate preference information for each channel, preference information for each video content, and preference information for each genre in each time interval by using the entire viewing time for the channel, video content, and genre in each time interval.

When the user command to display a recommended channel is input, the processor 130 may identify a channel for providing video content corresponding to the preference information at a time point at which the user command is input.

The processor 130 may receive a user command to display a recommended channel.

In this case, the user command may be received from a remote controller or may be input in various ways such as a user voice or a touch input for a button provided in the electronic device 100.

The processor 130 may identify a channel providing a video content corresponding to the preference information at a time point when the user command is input.

Here, a channel for providing content corresponding to preference information may include a channel for providing video content corresponding to preference information for each of a plurality of video contents and a channel for providing a video content of a genre corresponding to preference information for each of a plurality of genres.

The memory 110 may store broadcasting schedule information (electronic program guide (EPG)) provided by the broadcasting provider or the OTT service provider.

The broadcasting schedule information is metadata about broadcasting and may include information about a channel such as a channel name and a channel identifier for a plurality of channels and information about video content such as a broadcast time, a name, a genre, and a cast of a plurality of video content. However, this is an example, and the processor 130 may receive broadcasting schedule information from a server of a broadcasting provider or an OTT service provider through a communicator.

The processor 130, by comparing the broadcasting schedule information and the preference information stored in the memory 110, may identify a channel providing the video content corresponding to the preference information.

In an embodiment, the processor 130 may identify preference information for each of a plurality of video content and preference information for each genre in a time interval including a time point at which a user command is input, by using preference information stored in the memory 110.

The processor 130 may determine at least one channel for providing at least one video content included in preference information for each video content and at least one genre of video content included in preference information for each genre in a time interval in which a user command is input, by using the broadcasting schedule information.

For example, a user command for displaying a recommended channel is input between 18:00 and 19:00, and as shown in FIG. 4, preference information for each video content at 18:00 to 19:00 is as preference information 430-1.

In this case, the processor 130 may identify the program A, program D, and program E included in the preference information by video contents.

FIGS. 5-10 are diagrams illustrating a method of identifying a channel to provide a video content corresponding to user preference information in an electronic device according to an embodiment.

Figure 5:
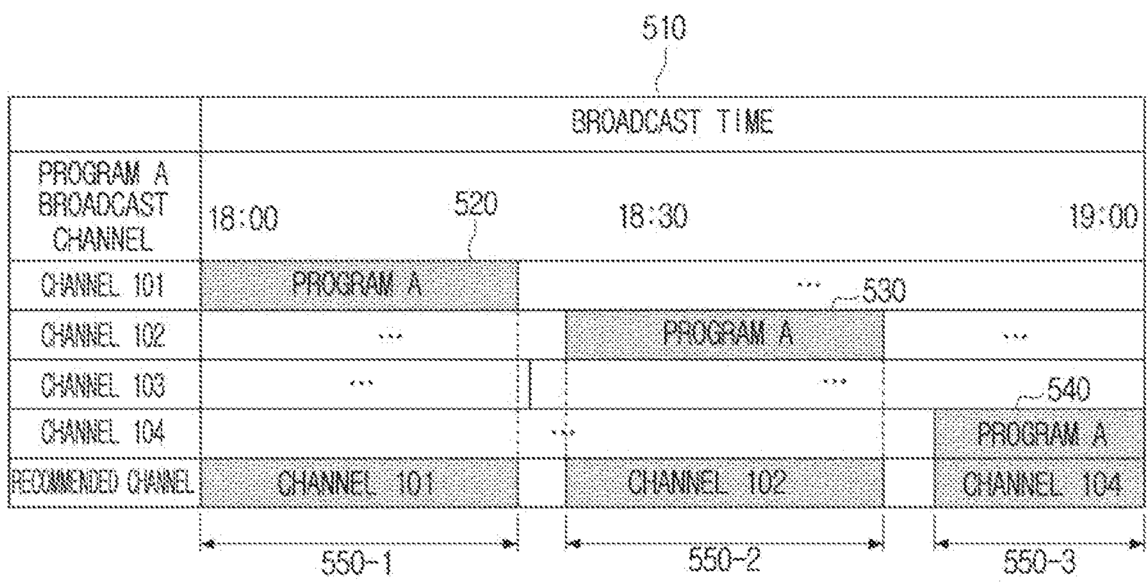

As shown in the broadcasting schedule information 510 shown in FIG. 5, in the case of 18:00 to 19:00, the program A is broadcast from 18:00 to 18:20 on channel 101 520, program A is broadcasted from 18:26 to 18:40 on channel 102 530, and program A is broadcasted from 18:45 to 19:00 on channel 104 540.

When a user command for displaying a recommended channel is inputted in a time interval 520 in which a program A is broadcasted on a channel 101, the processor 130 may identify a channel for providing a program A as the channel 101 550-1. In addition, when a user command for displaying a recommended channel is inputted in a time interval 530 in which a program A is broadcasted on a channel 102, the processor 130 may identify a channel for providing a program A as a channel 102 550-2. In addition, when a user command for displaying a recommended channel is inputted in a time interval 540 in which a program A is broadcasted in a channel 104, the processor 130 may identify a channel for providing a program A as a channel 104 550-3.

Although only program A has been described in the above-described example, the processor 130 may identify a channel in which a corresponding video content is provided according to a user command for displaying a recommended channel even for other video contents included in preference information for each video content at 18:00 to 19:00, that is, program D and program E.

In addition, the processor 130 may identify a channel for providing video content of a genre included in preference information for each genre in a time interval including the time point at which the user command is input, as well as preference information for each video content.

For example, a user command for displaying a recommended channel is input between 18:00 and 19:00, and as shown in FIG. 4, preference information for each genre at 18:00 to 19:00 is as preference information 440-1.

In this example, the processor 130 may identify reality and comedy included in the preference information by genres.

Figure 6:
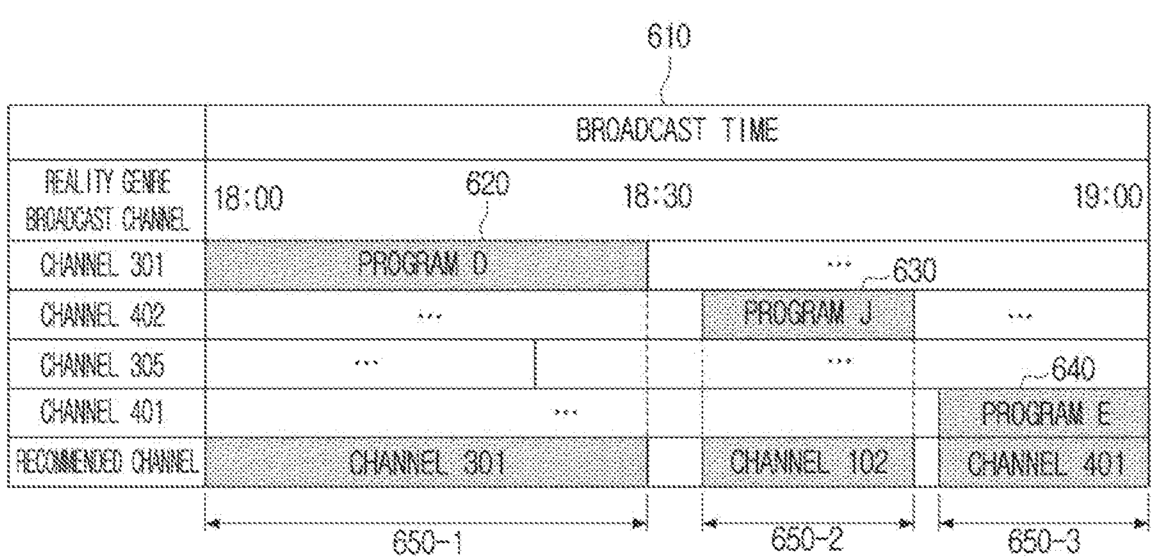

As shown in the broadcasting schedule information 610 shown in FIG. 6, in the case of 18:00 to 19:00, a program D of a reality genre is broadcasted from 18:00 to 18:30 620 on channel 301, and a program J of reality genre is broadcasted from 18:35 to 18:45 on channel 402 630, and a program E of a reality genre is broadcasted from 18:48 to 19:00 640 on a channel 401.

When a user command for displaying a recommended channel is inputted in a time interval 620 in which a program D is broadcasted in a channel 101, the processor 130 may identify, as channel 301, a channel for providing a program of reality genre 650-1. In addition, when a user command for displaying a recommended channel is inputted in a time interval 630 in which a program J is broadcasted in a channel 402, the processor 130 may identify, as a channel 402, a channel for providing a program of a reality genre 650-2. When a user command for displaying a recommended channel is inputted in a time interval 640 in which a program E is broadcasted in a channel 401, the processor 130 may identify, as a channel 401, a channel for providing a program of a reality genre 650-3.

Although only the reality genre has been described in the above-described example, the processor 130 may identify a channel in which the video content of the corresponding genre is provided according to a user command for displaying a recommended channel even for another genre included in preference information for each genre at 18:00 to 19:00, that is, a comedy genre.

There may be a plurality of channels for providing video content corresponding to preference information at a point in time when a user command for displaying a recommended channel is input.

For example, when a user command for displaying a recommended channel is inputted, program A included in preference information for each video content may be provided in channel 101 and channel 102. When a user command for displaying a recommended channel is inputted, there may be a case in which a program D and a program E of a comedy genre included in preference information for each genre are provided in the channel 103 and the channel 104.

In this case, the processor 130 may identify one channel among the plurality of channels based on at least one of a start time and an end time of video content provided from each of the plurality of identified channels.

As an example, the processor 130 may identify a channel having longest remaining time to the end of the video content, based on an end time of video content provided from each of the identified plurality of channels.

That is, when there are a plurality of channels that provide the same video content, the processor 130 may identify a channel that provides the video content having longest remaining time to the end of the video content among the plurality of channels. The purpose is to provide a user with information about a channel with the longest remaining time to the end of the current video content, thereby enabling a user to watch the preferred video content for a longer time.

Figure 7:
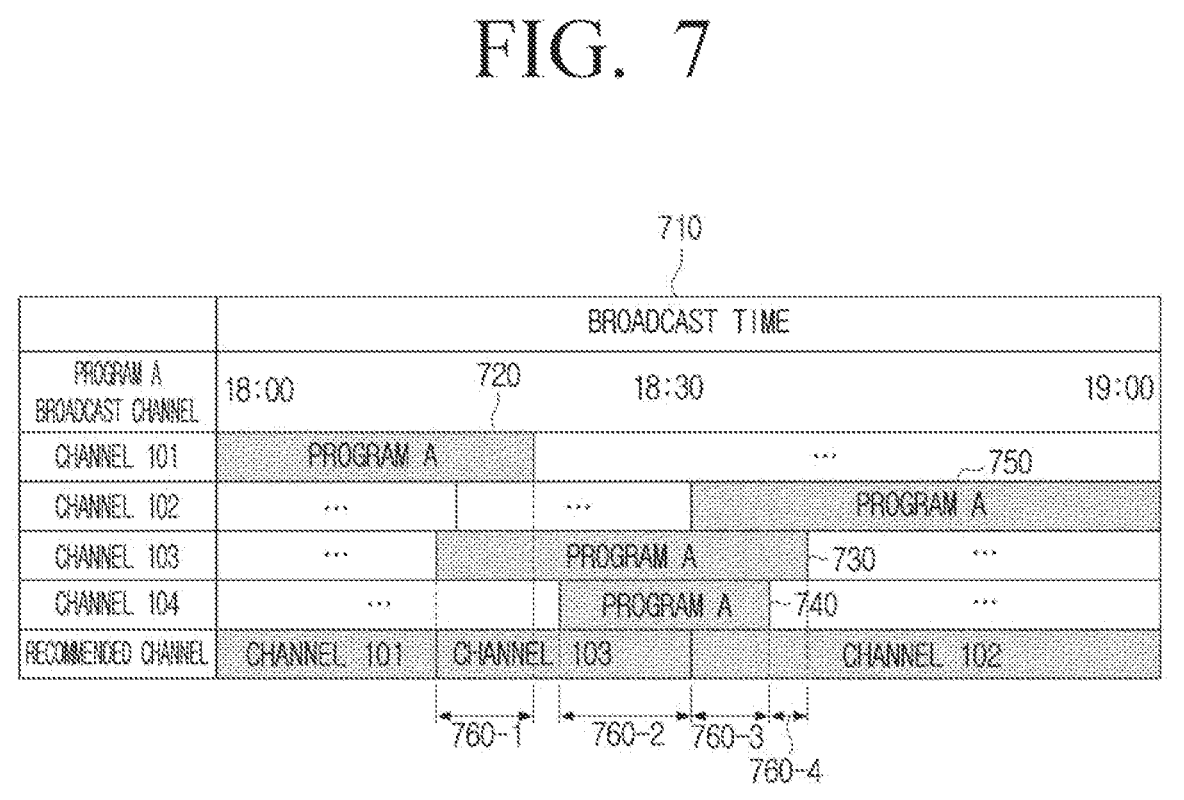

For example, in the broadcasting schedule information 710 shown in FIG. 7, program A is broadcasted from 18:00 to 18:20 on channel 101 720, a program A is broadcasted from 18:12 to 18:40 on channel 103 730, a program A is broadcasted from 18:22 to 18:35 on channel 104 740, and a program A is broadcasted from 18:32 to 19:00 on channel 102 750. The program A may be a video content included in the preference information for contents between 18:00 to 19:00 In an embodiment, the program A may be a video content of a genre included in preference information for each genre at 18:00 to 19:00.

When a user command for displaying a recommended channel is inputted in a time interval 760-1 from 18:12 to 18:20, or input in a time interval 760-2, 760-3, 760-4 between 18:22 to 18:40, the processor 130 may identify that a plurality of channels providing program A are provided.

In this case, when a user command for displaying a recommended channel is inputted in a time interval 760-1 between 18:12 to 18:20, the processor 130 may identify a channel 101 for broadcasting program A and a channel 103 for providing a program A which has longest remaining time to the end of the content.

Also, when a user command for displaying a recommended channel is inputted in a time interval 760-2 between 18:22 and 18:32, the processor 130 may identify a channel 103 for broadcasting a program A having a longest remaining time to the end of the content between channel 103 and channel 104 broadcasting the program A.

Also, when a user command for displaying a recommended channel is inputted in a time interval 760-3 between 18:32 and 18:35, the processor 130 may identify, as a recommended channel, a channel 102 for providing program A having the longest remaining time to the end of the video content among the channel 102, channel 103, and channel 104 broadcasting the program A.

Also, when a user command for displaying a recommended channel is inputted in a time interval 760-4 between 18:35 to 18:40, the processor 130 may identify, as a recommended channel, a channel 102 providing the program A having the longest remaining time to the end of the content between a channel 102 and channel 103 providing the program A.

When at least two channels having the longest remaining time to the end of the video content are identified with respect to a time point at which a user command is input from among the identified plurality of channels, the processor 130 may identify a channel in which a time when the video content starts is the latest with respect to the time point at which the user command is input among the at least two channels, based on the start time of the video content provided in each of the at least two channels.

That is, when a plurality of channels for providing the same video content exist and the time when the video content provided from the plurality of channels ends is the same, the processor 130 may identify a channel that provides the video content that the start time of the video content is the largest among the plurality of channels. The purpose is to provide a user with information about a channel having the closest start time among a plurality of channels having the same end time of video content, thereby enabling a user to watch preferred video content for a longer time while easily understanding and being immersed in the content of video content at the same time.

For example, as the broadcasting schedule information 810 shown in FIG. 8, the program A may be broadcasted from 18:00 to 18:20 820 on channel 101, the program A may be broadcasted from 18:12 to 18:40 830 on channel 103, the program A may be broadcasted from 18:20 to 18:40 840 on channel 104, and the program A may be broadcasted from 18:32 to 19:00 850 on channel 102. The program A may be video content included in preference information for each content at 18:00 to 19:00. In an embodiment, the program A may be a video content of a genre included in preference information for each genre at 18:00 to 19:00.

When a user command for displaying a recommended channel is inputted to a time interval 860-1, 860-2, 860-3 from 18:12 to 18:20, the processor 130 may identify that there are a plurality of channels providing program A.

In this case, when a user command for displaying a recommended channel is inputted to a time interval 860-1 between 18:12 to 18:20, the processor 130 may identify a channel 103 providing the program A having the longest time to end between the channels 101 and 103 broadcasting the program A.

Also, when a user command for displaying a recommended channel is inputted in a time interval 860-2 between 18:20 minutes and 18:32 minutes, the processor 130 may identify a channel 103 providing the program A of which the start time is the latest between the channel 103 and the channel 104 broadcasting the program A.

That is, since the end time of the program A broadcasted in the channel 103 and the channel 104 is the same as 18:40, the processor 130 may identify the channel 104 providing the program A of which the start time is 18:20, which is the latest between channel 103 and channel 104.

Also, when a user command for displaying a recommended channel is inputted in a time interval 860-3 between 18:32 and 18:40, the processor 130 may identify, as a recommended channel, a channel 102 providing the program A having the longest remaining time to the end of the video content between the channel 102, channel 103, and channel 104 broadcasting the program A.

In another example, the processor 130 may identify a channel in which a time at which a video content starts is the latest based on a time point at which a user command is input among a plurality of identified channels based on a start time of a program provided in each of the plurality of identified channels.

That is, when there are a plurality of channels that provide the same video content, the processor 130 may identify a channel that provides the video content that the start time is the latest among the plurality of channels. This is to provide a user with information about a channel having the closest start time of video content, thereby enabling a user to easily understand and be immersed in the content of the video content preferred by the user.

Figure 9:
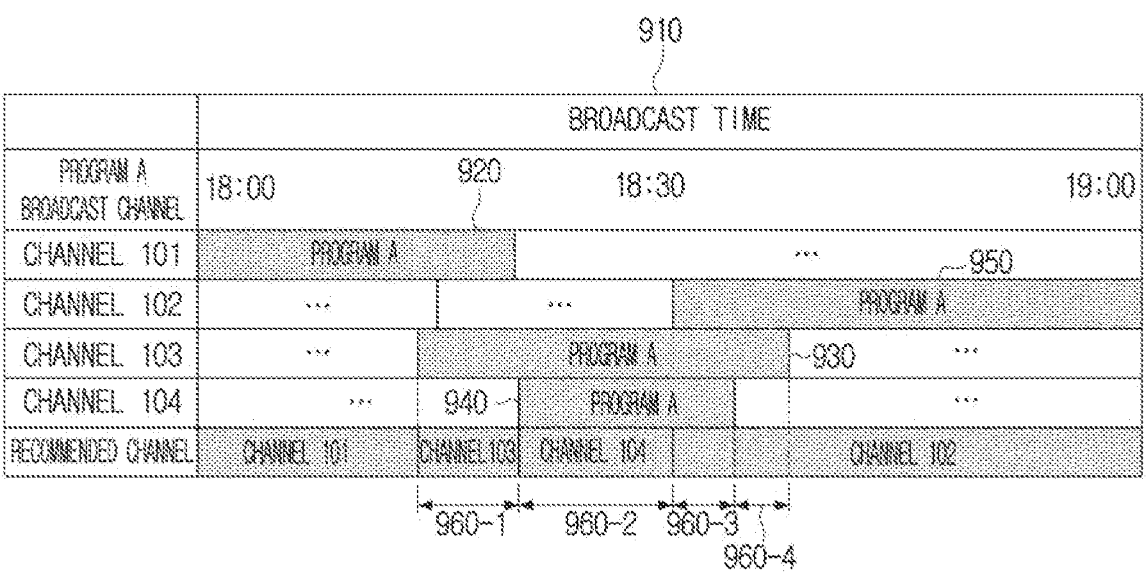

For example, as the broadcasting schedule information 910 shown in FIG. 9, the program A is broadcasted on channel 101 from 18:00 to 18:20 920, the program A is broadcasted from 18:12 to 18:40 on channel 103 930, program A is broadcasted from 18:20 to 18:35 on channel 104 930, and program A is broadcasted from 18:32 to 19:00 950 on channel 102. The program A may be video content included in preference information for each content at 18:00 to 19:00. In an embodiment, the program A may be a video content of a genre included in preference information for each genre at 18:00 to 19:00.

At this time, when a user command to display a recommend channel is input to time intervals 960-1, 960-2, 960-3, 960-4 between 18:12 and 18:20, the processor 130 may identify that there are a plurality of channels providing the program A.

In this case, when a user command for displaying a recommended channel is inputted in a time interval 960-1 between 18:12 and 18:20, the processor 130 may identify a channel 103 providing a program A of which the start time is latest between the channel 101 and the channel 103 broadcasting the program A.

When a user command for displaying a recommended channel is inputted in a time interval 960-2 between 18:20 and 18:32, the processor 130 may identify a channel 104 providing the program A of which the start time is the latest between channel 103 and channel 104 broadcasting the program A.

Also, when a user command for displaying a recommended channel is inputted to a time interval 960-3 between 18:32 and 18:35, the processor 130 may identify a channel 102 for providing the program A of which the start time is the latest, between channel 102, channel 103, and channel 104 broadcasting the program A.

Also, when a user command for displaying a recommended channel is inputted in a time interval 960-4 between 18:35 and 18:40, the processor 130 may identify a channel 102 providing the program A of which the start time is the latest between channel 102 and channel 103 broadcasting the program A.

when at least two channels having the most recently started video content are identified based on a point in time at which a user command is input from among the identified plurality of channels, the processor 130 may identify a channel having the longest remaining time to the end of the video content based on a time point at which the user command is input among at least two channels.

That is, when a plurality of channels for providing the same video content exist and the start time of the video content provided from the plurality of channels is the same, the processor 130 may identify a channel for providing the video content having the longest remaining time to the end of the content among the plurality of channels. This is to provide a user with information about a channel which has the longest remaining end time among a plurality of channels having the same start time of video content, thereby enabling a user to easily understand and be immersed in the content of the video content preferred by the user, and simultaneously watch video content for a longer time.

Figure 10:
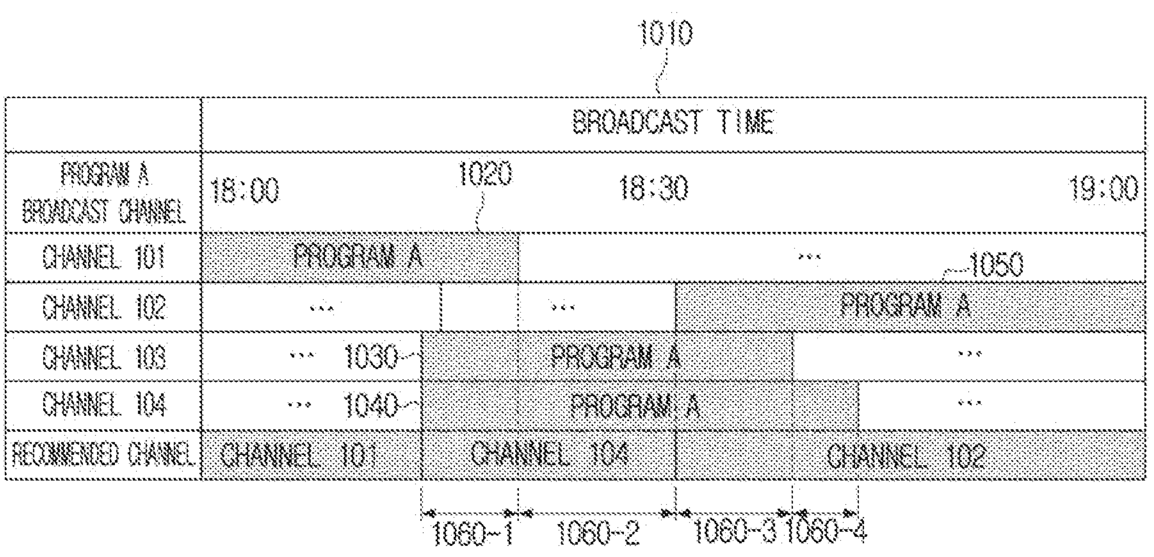

For example, as shown in the broadcasting schedule information 1010 shown in FIG. 10, program A is broadcasted from 18:00 to 18:20 on channel 101 1020, the program A is broadcasted from 18:12 to 18:40 on channel 103 1030, program A is broadcasted from 18:12 to 18:45 on channel 104 1040, and program A is broadcasted from 18:32 to 19:00 1050 on channel 102. The program A may be video content included in preference information for each content at 18:00 to 19:00. In an embodiment, the program A may be a video content of a genre included in preference information for each genre at 18:00 to 19:00.

At this time, when a user command to display a recommend channel is input to time intervals 1060-1, 1060-2, 1060-3, 1060-4 between 18:12 and 18:45, the processor 130 may identify that there are a plurality of channels providing the program A.

If a user command for displaying a recommended channel is inputted in a time interval 1060-1 between 18:12 to 18:20 1060-1, the processor 130 may identify a channel 101 providing a program A of which the start time is the latest among channel 101, channel 103, and channel 104 broadcasting the program A.

When a user command for displaying a recommended channel is inputted in a time interval 1060-2 between 18:20 and 18:32, the processor 130 may identify a channel 104 providing a program A of which the remaining time until to the end time is most among the channel 103 and the channel 104 broadcasting the program A.

That is, since the start time of the program A broadcasted in the channel 103 and the channel 104 is equal to 18:12, the processor 130 may identify the channel 104 providing the program A with the longest remaining time to the end of the content of 18:45 between the channel 103 and the channel 104.

In addition, when a user command for displaying a recommended channel is inputted in a time interval 1060-3 between 18:32 to 18:40, the processor 130 may identify a channel 102 which provides a program A of which the start time is the latest, among channel 102, channel 103, and channel 104 broadcasting the program A.

Also, when a user command for displaying a recommended channel is inputted in a time interval 1060-4 between 18:40 and 18:45, the processor 130 may identify a channel 102 providing a program A of which the start time is the latest between the channel 102 and the channel 104 broadcasting program A.

Using the method as described above, the processor 130 may identify at least one channel for providing video content corresponding to preference information among a plurality of channels. the processor 130 may control the display 120 to display information about the identified channel.

That is, the processor 130 may display a recommended channel list including information about the identified channel on the display 120.

The information about the identified channel may include at least one of a channel name of the identified channel and a thumbnail image for video content provided by the identified channel.

The metadata stored in the memory 110 may include a thumbnail image of the video content matched for each video content provided by a plurality of channels or the OTT service.

In this case, when the processor 130 identifies a channel for providing video content corresponding to preference information, the processor 130 may obtain a thumbnail image matching the video content provided from the identified channel from the metadata.

In addition, the processor 130 may display, on the display 120, information about an identified channel including at least one of a name of the identified channel and a thumbnail image of video content provided by the obtained identified channel.

In this case, the processor 130 may display information about a channel identified in the order of video content having a high preference based on preference information for each of a plurality of video content, and display information about a channel identified in order of genre having a high preference based on preference information for each of the plurality of genres.

In an embodiment, the processor 130 may identify a preference ranking for each video content of a channel identified based on preference information for each video content in preference information, and identify a genre-specific preference ranking of the identified channel based on preference information for each genre among the preference information.

in displaying the information about the identified channel, the processor 130 may display information about a channel corresponding to the preference by channels as well.

In this case, the processor 130 may display information about a plurality of channels in the order of channels having a high preference based on preference information for each of the plurality of channels. That is, the processor 130 may display information about a channel in the order of channels having a high preference based on preference information for each of a plurality of channels.

In an embodiment, the processor 130 may determine the preference ranking by channels based on the preference information by channels among preference information.

FIG. 11 is a diagram illustrating a method of displaying information about an identified channel by an electronic device according to an embodiment.

For example, as shown in FIG. 11, a user command for displaying a recommended channel is input at 18:40, and preference information 420-1 for each channel at 18:00 to 19:00, preference information 430-1 for each video content, and preference for each genre 440-1 are as shown in FIG. 4.

As shown in FIG. 11, a channel provided by program A included in preference information 430-1 for each video content is channel 102, a channel through which program D is provided is channel 302, and a channel through which program E is provided is channel 406.

Also, as shown in FIG. 11, a channel providing a program of a reality genre included in preference information 440-1 for each genre is a channel 402, and a channel in which a program of the comedy genre is provided is a channel 503.

In this case, as shown in FIG. 11, according to preference information for each channel, the channel 101, the channel 301, and the channel 401 may have a high ranking, and according to preference information for each video content, the channel 102, the channel 302, and the channel 406 may have a high ranking, and the channel 402 and the channel 503 may have a high rank according to preference information for each genre.

In this case, the processor 130 may display, on a first box 121-1, information about the channel 101, which is the first priority of the channel preference, based on the left side of the recommended channel list 121, display information about the channel 102, which is the first priority for each video content, in the second box 121-1, and display, on the third box 121-3, information about the channel 402, which is the first priority of preference for each genre.

In addition, the processor 130 may display information about a channel 301, which is a second priority of channel preference, in a fourth box 121-4, display information about a channel 302, which is a second priority of preference for each video content, in a fifth box 121-5, and display information about a channel 503, which is a second priority of content preference for each genre, on a sixth box 121-6.

In addition, the processor 130 may display, on a seventh box, information about a channel 401 having a third priority of channel preference, and display, on a sixth box, information about a channel 406 which is a third priority of preference for each video content.

In an embodiment, the processor 130 may provide, in a limited space of the display 120, a recommended channel based on preference information for each channel, video content, and genre according to a preferred priority to the user, thereby increasing the utility of the recommended channel list displayed on the display 120.

Figure 12:
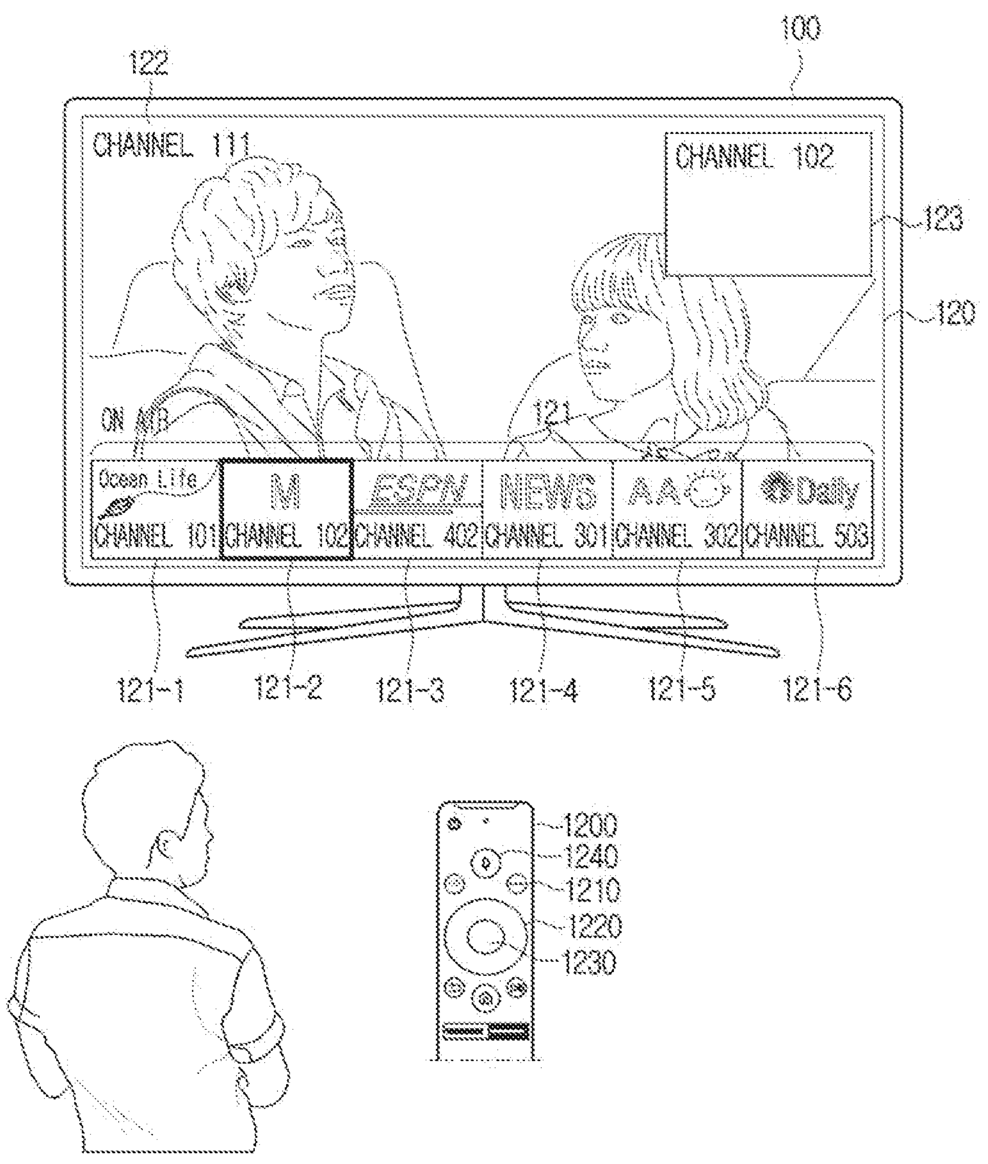

FIGS. 12-13 are diagrams illustrating a method of displaying a recommended channel list by the electronic device 100 according to an embodiment.

Referring to FIG. 12, the display 120 of the electronic device 100 may display information 122 about a channel providing the video content currently displayed, the recommended channel list 121, and information 123 about a channel selected from a recommended channel list.

The information 123 about the channel selected from the recommended channel list may include information related to video content provided in a selected channel such as a real-time screen of video content provided in the selected channel, a scenario of video content, and a cast.

The operation of the electronic device 100 may be controlled by a remote controller 1200 interworking with the electronic device 100. In an embodiment, the remote controller 1200 may include a signal transmitter for transmitting a signal for controlling the electronic device 100.

The remote controller 1200 may include a recommendation channel display button 1210 for displaying a recommended channel list, a movement button 1220, and a selection button 1230. In this case, when the user manipulates the recommended channel display button 1210 (e.g., when a recommended channel display button is pressed), the remote controller 1200 may transmit a signal including a user command for displaying the recommended channel list to the electronic device 100.

When a user command for displaying a recommended channel is input, the processor 130 may identify a channel for providing video content corresponding to preference information at a time point when a user command is input, and display a recommended channel list 121 including information about the identified channel on the display 120.

a user command to display a recommended channel list may be input to the electronic device 100 not only by a user manipulation of a remote controller 1210 but also a voice signal of a user.

In this example, the user's voice signal may be performed through a voice recognition performed after pressing a voice recognition button 1240 of the remote controller 1200 or a microphone of the electronic device 100.

For example, when a user presses a voice recognition button 1240 and then inputs a voice signal "please display a recommended channel", the processor 130 may analyze the input voice signal to identify whether the input voice signal is a user command for displaying a recommended channel list.

The processor 130 may identify a channel for providing video content corresponding to preference information at a time identified as a user command for displaying a recommended channel list when the input voice signal is identified as a user command for displaying the recommended channel list, and display a recommended channel list 121 including information about the identified channel on the display 120.

When a user selects information about a specific channel from the recommended channel list 121 and inputs a channel switching command, the video content displayed on the display 120 may be converted into video content provided by the selected channel.

For example, as shown in FIG. 13, when a video content provided by channel 111 is displayed on the display 120 and a user command for displaying a recommended channel is input, the processor 130 may identify a channel for providing video content corresponding to the preference information at a time point when a user command for displaying the recommended channel is input, and display information about the identified channel in the recommended channel list 121. In this case, by operating the position movement button 1220 of the remote controller 1200 of the user, information 121-1 about channel 102 may be selected, and a command for switching to channel 102 by manipulation of the selection button 1230 may be input to the electronic device 100.

When a command to switch to the channel 102 is input, the processor 130 may switch a channel providing the video content displayed on the display 120 from the channel 111 to the channel 102, and display the video content provided by the channel 102 on the display 120.

Accordingly, a user may input a channel switching command based on the information about channels displayed in a recommended channel list, thereby enabling the user to watch preferred video content more simply.

Figure 14:
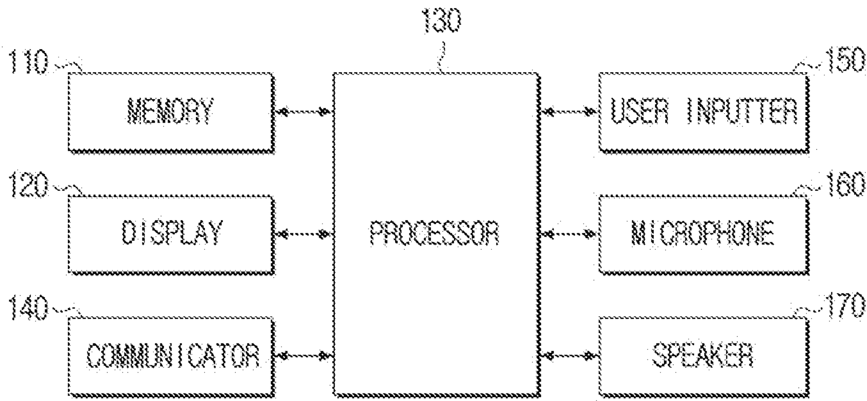
FIG. 14 is a block diagram illustrating a detailed configuration according to an embodiment.

FIG. 14 is a block diagram illustrating a detailed configuration according to an embodiment.

Referring to FIG. 14, the electronic device 100 may include a memory 110, a display 120, a processor 130, a communicator 140, a user inputter 150, a microphone 160, and a speaker 170. These components may be controlled by the processor 130.

the elements of FIG. 13 is merely an example, and at least some elements may be omitted or other elements may be added according to an example.

The memory 110, the display 120, and the processor 130 have been described in FIGS. 1 to 12, and a duplicate description will be omitted.

The communicator 140 is configured to communicate with an external device. In an embodiment, the communicator 140 may communicate with a broadcasting station of a business of a broadcasting service or a server of an OTT service provider through a network.

For example, the processor 130 may receive various video contents provided by various broadcasting service providers or OTT service providers through a channel through the communicator 140.

In addition, the processor 130 may receive, through the communicator 140, metadata including broadcasting schedule information provided by service providers of various broadcasting service providers or OTT service providers and information about video content provided through the broadcasting and OTT service.

In an embodiment, the communicator 140 may include various broadcasting reception modules to receive video contents provided by a broadcasting provider, like an antenna, an analog tuner, a digital tuner, or the like.

In addition, various modules for accessing network, like a network card, may be included.

As another example, the communicator 140 may access a network by using a Wi-Fi communication module for performing Wi-Fi communication, and may access a network through various mobile communication methods such as 3G, Long Term Evolution (LTE), and 5G by using a mobile communication module for performing mobile communication.

The user inputter 150 may receive various user commands. The component is for receiving various user commands. For example, the user inputter 150 may include a touch panel or the like, and may also receive various user commands from a remote controller for controlling the electronic device 100 including a remote controller signal receiver.

The processor 130 may control other elements to perform various functions according to the user command input to the user inputter 150.

For example, the processor 130 may receive a user command for displaying a recommended channel through the user inputter 150. In this case, the processor 130 may receive a user command for displaying a recommended channel from various external electronic devices such as a remote controller, a smart phone, and an external voice recognition device through the user inputter 150. When a user command for displaying a recommended channel is input through the user inputter 150, the processor 130 may identify a channel for providing video content corresponding to preference information at a time when the user command is input.

The microphone 160 is an element to receive various voice signals.

For example, the microphone 160 may receive an audio signal including the user's voice uttered by a user, convert the audio signal into an electrical signal, and provide the electrical signal to the processor 130. In this case, the processor 130 may identify whether a user command for displaying a recommended channel exists by recognizing the audio signal received from the microphone 160. When it is identified that there is a user command for displaying the recommended channel, the processor 130 may identify a channel for providing video content corresponding to the preference information at the time when the audio signal is input.

The speaker 170 is configured to output various sounds.

For example, the processor 130 may control the speaker 170 to output an audio signal of the video content displayed on the display 120.

Figure 15:
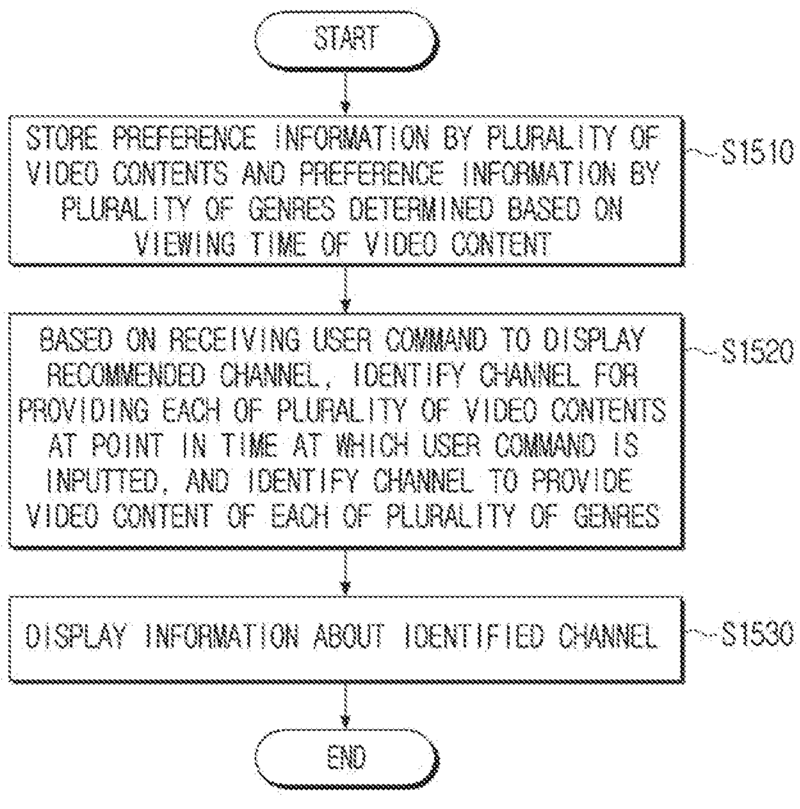
FIG. 15 is a flowchart illustrating a method of controlling an electronic device according to an embodiment.

FIG. 15 is a flowchart illustrating a method of controlling an electronic device according to an embodiment.

The preference information by a plurality of video contents and preference information by a plurality of genres determined based on viewing time of video content may be stored in operation S1410.

The preference information may further include preference information by a plurality of channels determined based on the viewing time of the video content.

Based on receiving a user command to display a recommended channel, a channel for providing video content corresponding to the preference information may be identified at a point in time at which a user command is inputted, and a channel to provide video content of each of the plurality of genres may be identified in operation S1420.

Based on a plurality of channels providing video content corresponding to the preference information at the point in time at which the user command is inputted, one from among the plurality of identified channels may be identified based on at least one of a start time and an end time of the video content provided from each of the plurality of identified channels.

Based on the end time of the video content provided from each of the plurality of identified channels, a channel having a longest remaining time to end of the video content may be identified with respect to a point in time at which the user command is inputted, from among the plurality of identified channels.

Based on identifying that there are at least two channels having a longest remaining time to end of the video content with respect to a point in time at which the user command is inputted from among the plurality of identified channels, based on a start time of video content provided from each of the at least two channels, a channel in which a start time of the video content is latest may be identified with respect to a time point at which the user command is inputted among the at least two channels.

Based on a start time of a video content provided by each of the plurality of identified channels, a channel in which a start time of the video content is latest may be identified with reference to a point in time at which the user command is inputted, among the plurality of identified channels.

Based on at least two channels in which the video content starts most recently being identified with reference to a point in time at which the user command is inputted among the plurality of identified channels, based on an end time of the video content provided in each of the at least two channels, a channel having longest remaining time to end of the video content may be identified with reference to a point in time at which the user command is inputted among the at least two channels.

The information about a channel identified based on the preference information may be displayed in operation S1430.

The information about the identified channel may be displayed in an order of video content having high preference based on the preference information by the plurality of video contents, and information about the identified channel in an order of a genre having high preference may be displayed based on the preference information by the plurality of genres, the plurality of video contents may have higher preference as the video content has more viewing times, and the plurality of genres may have higher preference as the genres have more viewing times.

The preference information may be displayed by a plurality of channels determined based on a viewing time of the video content, and the plurality of channels may have a higher preference as the channels have more viewing times.

The information about the identified channel may include at least one of a name of a channel of the identified channel or a thumbnail image of the video content provided by the identified channel.

Furthermore, various embodiments of the disclosure may be implemented in software, including instructions stored on machine-readable storage media readable by a machine (e.g., a computer). An apparatus may call instructions from the storage medium, and execute the called instruction, including an electronic apparatus (e.g., electronic apparatus A) according to the embodiments herein. When the instructions are executed by a processor, the processor may perform a function corresponding to the instructions directly or by using other components under the control of the processor. The instructions may include code generated by a compiler or code executable by an interpreter. A machine-readable storage medium may be provided in the form of a non-transitory storage medium. Herein, the term "non-transitory" denotes that a storage medium does not include a signal (e.g., electromagnetic wave), but is tangible and does not distinguish the case in which data is semi-permanently stored in a storage medium from the case in which data is temporarily stored in a storage medium. For example, "non-transitory" storage medium may include a buffer in which data is temporarily stored.

According to embodiments, a method disclosed herein may be provided in software of a computer program product. A computer program product may be traded between a seller and a purchaser as a commodity. A computer program product may be distributed in the form of a machine readable storage medium (e.g., compact disc read only memory (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims and their equivalents. Also, it is intended that such modifications are not to be interpreted independently from the technical idea or prospect of the disclosure.

What is claimed is:

1. An electronic device comprising:

a display;

a memory for storing preference information of a user, and at least one instruction, the preference information of the user determined based on a viewing time of video content; and at least one processor configured to execute the at least one instruction to:

based on receiving a user command to display a recommended channel, identify a plurality of channels for providing video content corresponding to the preference information at a point in time at which the user command is received, wherein the plurality of identified channels provide the video content with each of a plurality of different predetermined broadcasting durations, identify the recommended channel from among the plurality of identified channels, wherein a ratio of a provision duration, during which the video content is provided by the recommended channel from the point in time, to a predetermined broadcasting duration is the greatest from among a plurality of ratios corresponding to the plurality of identified channels, the plurality of ratios being obtained based on a plurality of time durations corresponding to each of the plurality of identified channels, each of the plurality of time durations being a time duration between the point in time at which the user command is received and one of (i) a predetermined start time of a video content provided by each of the plurality of identified channels, and (ii) a predetermined end time of the video content provided by each of the plurality of identified channels, and control the display to display channel information about the identified recommended channel, wherein each of the plurality of different predetermined broadcasting durations is a duration between the predetermined start time and the predetermined end time.

2. The electronic device of claim 1, wherein the at least one processor is further configured to execute the at least one instruction to:

identify the recommended channel from among the plurality of identified channels based on the predetermined end time of the video content provided by each of the plurality of identified channels such that the video content provided by the recommended channel has, as the time duration, a longest remaining time to the predetermined end time of the video content with respect to the point in time at which the user command is received.

3. The electronic device of claim 2, wherein the at least one processor is further configured to execute the at least one instruction to:

based on identifying at least two channels providing video content of a same program having the longest remaining time from among the plurality of identified channels, identify the recommended channel from among the at least two channels such that the video content of the same program provided by the recommended channel has a later predetermined start time with respect to the point in time at which the user command is received.

4. The electronic device of claim 1, wherein the at least one processor is configured to execute the at least one instruction to:

based on the predetermined start time of the video content provided by each of the plurality of identified channels, identify the recommended channel among the plurality of identified channels based on video content having a most recent predetermined start time with reference to the point in time at which the user command is received.

5. The electronic device of claim 4, wherein the at least one processor is configured to execute the at least one instruction to:

based on identifying at least two channels providing video content having the most recent predetermined start time from among the plurality of identified channels, identify the recommended channel from among the at least two channels such that the video content provided by the recommended channel has, as the time duration, a longest remaining time to the predetermined end time of the video content with respect to the point in time at which the user command is received.

6. The electronic device of claim 1, wherein the preference information comprises a plurality of preferred video contents and a plurality of preferred genres determined based on a viewing time associated with each of the plurality of preferred video contents and a viewing time of each of the plurality of preferred genres, and wherein the at least one processor is configured to execute the at least one instruction to:

based on the user command to display the recommended channel being received, identify the plurality of channels for providing each of the plurality of preferred video contents and each of the plurality of preferred genres at the point in time at which the user command is received, display the channel information corresponding to each of the plurality of identified channels based on an order of the plurality of preferred video contents, and display the channel information corresponding to the plurality of identified channels based on an order of the plurality of preferred genres, wherein the order of the plurality of preferred video contents is based on the viewing time associated with each of the plurality of preferred video contents, and wherein the order of the plurality of preferred genres is based on the viewing time associated with each of the plurality of preferred genres.

7. The electronic device of claim 6, wherein the preference information further comprises a plurality of preferred channels determined based on a viewing time associated with each of the plurality of preferred channels, wherein the at least one processor is configured to execute the at least one instruction to:

control the display to display the channel information about the plurality of preferred channels based on the order of the plurality of preferred channels, and wherein the order of the plurality of preferred channels is based on the viewing time associated with each of the plurality of preferred channels.

8. The electronic device of claim 1, wherein the channel information about the recommended channel comprises at least one of a channel name or a thumbnail image of the video content provided by the recommended channel.

9. The electronic device according to claim 1, wherein the at least one processor is further configured to execute the at least one instruction to:

identify as plurality of recommended channels, and control the display to sequentially display the plurality of recommended channels in accordance with the point in time.

10. A method of controlling an electronic device, comprising:

storing preference information of a user, the preference information comprising a plurality of preferred video contents and a plurality of preferred genres based on a viewing time of video content;

based on receiving a user command to display a recommended channel, identifying a plurality of channels for providing video content at a point in time at which the user command is received, the video content corresponding to the plurality of preferred video contents the plurality of preferred genres, wherein the plurality of identified channels provide the video content with each of a plurality of different predetermined broadcasting durations;

identifying the recommended channel from among the plurality of identified channels, wherein a ratio of a provision duration, during which the video content is provided by the recommended channel from the point in time to a predetermined broadcasting duration is the greatest from among a plurality of ratios corresponding to the plurality of identified channels, the plurality of ratios being obtained based on a plurality of time durations corresponding to each of the plurality of identified channels, each of the plurality of time durations being a time duration between the point in time at which the user command is received and one of (i) a predetermined start time of a video content provided by each of the plurality of identified channels, and (ii) a predetermined end time of the video content provided by each of the plurality of identified channels; and displaying channel information about the identified recommended channel based on the preference information, wherein each of the plurality of different predetermined broadcasting durations is a duration between the predetermined start time and the predetermined end time.

11. The method of claim 10, wherein the identifying the recommended channel comprises:

identifying at least two channels providing video content of a same program having a longest remaining time, from among the plurality of identified channels; and identifying the recommended channel from among the at least two channels such that the video content of the same program provided by the recommended channel has a later predetermined start time with respect to the point in time at which the user command is received.

12. The method of claim 10, wherein the identifying the recommended channel comprises:

based on the predetermined start time of the video content provided by each of the plurality of identified channels, identifying the recommended channel among the plurality of identified channels based on video content having a most recent predetermined start time with reference to the point in time at which the user command is received.

13. The method of claim 12, wherein the identifying the recommended channel comprises:

identifying at least two channels providing video content having the most recent predetermined start time from among the plurality of identified channels; and identifying the recommended channel from among the at least two channels such that the video content provided by the recommended channel has a later predetermined start time with reference to the point in time at which the user command is received.

14. The method of claim 10, wherein the displaying the channel information about the identified recommended channel comprises:

displaying the channel information corresponding to the plurality of identified channels based on an order of the plurality of preferred video contents;

displaying the channel information corresponding to the plurality of identified channels based on an order of the plurality of preferred genres, wherein the order of the plurality of preferred video contents is based on a viewing time associated with each of the plurality of preferred video contents, and wherein the order of the plurality of preferred genres is based on a viewing time associated with each of the plurality of preferred genres.

15. The method of claim 14, wherein the preference information further comprises a plurality of preferred channels determined based on a viewing time associated with each of the plurality of preferred channels, wherein the displaying the channel information about the plurality of identified channels comprises displaying information about the plurality of preferred channels based on the order of the plurality of preferred channels, and wherein the order of the plurality of preferred channels is based on the viewing time associated with each of the plurality of preferred channels.

16. A non-transitory computer readable medium for storing computer readable program code or instructions which are executable by a processor to perform a method for controlling an electronic device, the method comprising:

storing preference information of a user, the preference information comprising a plurality of preferred video contents and a plurality of preferred genres based on a viewing time of video content;

based on receiving a user command to display a recommended channel, identifying a plurality of channels for providing video content at a point in time at which the user command is received, the video content corresponding to the plurality of preferred video contents the plurality of preferred genres, wherein the plurality of identified channels provide the video content with each of a plurality of different predetermined broadcasting durations;

identifying the recommended channel from among the plurality of identified channels, wherein a ratio of a provision duration, during which the video content is provided by the recommended channel from the point in time to a predetermined broadcasting duration is the greatest from among a plurality of ratios corresponding to the plurality of identified channels, the plurality of ratios being obtained based on a plurality of time durations corresponding to each of the plurality of identified channels, each of the plurality of time durations being a time duration between the point in time at which the user command is received, and one of (i) a predetermined start time of a video content provided by each of the plurality of identified channels, and (ii) a predetermined end time of the video content provided by each of the plurality of identified channels; and displaying channel information about the identified recommended channel based on the preference information, wherein each of the plurality of different predetermined broadcasting durations is a duration between the predetermined start time and the predetermined end time.

17. The non-transitory computer readable medium of claim 16, wherein the identifying the recommended channel comprises:

identifying at least two channels providing video content of a same program having a longest remaining time, from among the plurality of identified channels; and identifying the recommended channel from among the at least two channels such that the video content of the same program provided by the recommended channel has a later predetermined start time with respect to the point in time at which the user command is received.

18. The non-transitory computer readable medium of claim 16, wherein the identifying the recommended channel comprises:

identifying at least two channels providing video content having a most recent predetermined start time, from among the plurality of identified channels; and identifying the recommended channel from among the at least two channels such that the video content provided by the recommended channel has a later predetermined start time with reference to the point in time at which the user command is received.

19. The non-transitory computer readable medium of claim 16, wherein the displaying the channel information about the identified recommended channel comprises:

displaying the channel information corresponding to the plurality of identified channels based on an order of the plurality of preferred video contents;

displaying the channel information corresponding to the plurality of identified channels based on an order of the plurality of preferred genres, wherein the order of the plurality of preferred video contents is based on a viewing time associated with each of the plurality of preferred video contents, and wherein the order of the plurality of preferred genres is based on a viewing time associated with each of the plurality of preferred genres.

20. The non-transitory computer readable medium of claim 16, wherein the preference information comprises a plurality of preferred channels determined based on a viewing time associated with each of the plurality of preferred channels, wherein the displaying the channel information about the plurality of identified channels comprises displaying information about the plurality of preferred channels based on an order of the plurality of preferred channels, and wherein the order of the plurality of preferred channels is based on the viewing time associated with each of the plurality of preferred channels.

* * * * *